United States Patent

[11] 3,619,671

| [72] | Inventor | Andrew Shoh<br>Ridgefield, Conn. |
|---|---|---|
| [21] | Appl. No. | 888,468 |
| [22] | Filed | Dec. 29, 1969 |
| [45] | Patented | Nov. 9, 1971 |
| [73] | Assignee | Branson Instruments, Incorporated<br>Stamford, Conn. |

[54] TRANSDUCER FOR ULTRASONIC MACHINE TOOL
16 Claims, 2 Drawing Figs.

[52] U.S. Cl.................................................. 310/8.2,
    51/59 SS, 77/5 R, 310/8.3, 310/8.7, 310/9.1
[51] Int. Cl.................................................. H01v 7/00
[50] Field of Search............................................ 51/59, 59
    SS, 34, 34.7, 56, DIG. 11; 77/5, 5 CB; 310/8.2, 8.3,
    8.7, 26; 173/97, 100, 104

[56] References Cited
UNITED STATES PATENTS

| 2,831,295 | 4/1958 | Weiss | 310/8.2 X |
|---|---|---|---|
| 2,930,912 | 3/1960 | Miller | 310/8.2 X |
| 2,962,695 | 11/1960 | Harris | 310/8.2 X |
| 3,015,914 | 1/1962 | Roney | 51/56 |
| 3,105,482 | 10/1963 | Mieville | 51/59 X |
| 3,368,086 | 2/1968 | Libby | 310/8.2 X |
| 3,482,360 | 12/1969 | Legge | 51/59 X |
| 2,651,148 | 9/1953 | Carwile | 51/59 |
| 3,471,724 | 10/1969 | Balamuth | 310/26 |

Primary Examiner—Milton O. Hirshfield
Assistant Examiner—Mark O. Budd
Attorney—Ervin B. Steinberg ABSTRACT: An ultrasonic transducer for machine tool purposes comprises two elongated coaxially disposed members coupled to each other with one of the members being adapted to oscillate as a half-wavelength resonator at the predetermined frequency, typically 20 kHz. The transducer is designed to be coupled to a drill of conventional design and when so coupled causes a tool bit to rotate while undergoing axial oscillation at the predetermined frequency.

TRANSDUCER FOR ULTRASONIC MACHINE TOOL

This invention refers to an ultrasonic machine tool such as is disclosed, for instance, in U.S. Pat. No. 3,015,914 entitled "Machine Tool," issued to R. N. Roney on Jan. 9, 1962, or in U.S. Pat. No. 3,482,360 entitled "Ultrasonic Machining Apparatus" issued to Percy Legge on Dec. 9, 1969. An ultrasonic machine tool of this type includes generally an electromechanical transducer which is fitted at its output end with a tool bit adapted to operate on a workpiece. The tool bit, typically a drill or a diamond impregnated tool, is driven at a predetermined rotational speed while undergoing vibration in the axial direction. The axial vibration is most commonly at a frequency in excess of 16 kHz., such as 20 to 25 kHz. and is produced by the electromechanical transducer which includes piezoelectric or magnetostrictive means for providing mechanical vibration responsive to electrical excitation.

The constructions disclosed in the prior art are specialized machines which are rather heavy and cumbersome. In view of the recent development of high-stress metals and lightweight metal laminates, such as titanium and tungstenboron laminates, the so-called ultrasonic machine tool has found increased interest and acceptance. These metals and laminates are difficult to machine without the assistance of the ultrasonic vibrations. However, the presently available ultrasonic machine tools do not lend themselves for drilling holes in situ as is required, for instance, when assembling aircraft wings or similar large structures. In these cases a portable drill device is usually employed and a long felt need has been a coupler which can be attached to a more or less standard portable drill, the coupler providing the ultrasonic longitudinal vibration needed for more successfully operating on the materials stated heretofore. The device disclosed hereafter meets this very need and provides a ready means for converting a standard rotary tool to one which provides also the ultrasonic motion found so very helpful in machining hard and brittle materials.

Aside from meeting this long felt need, the electromechanical transducer design disclosed hereafter providing vibration in the ultrasonic frequency range is endowed with several other and most desirable features. The transducer device is provided with precise and accurate concentric mounting means disposed at a location close to the output end which receives the tool adapted to operate on the workpiece. Furthermore, the transducer construction described and illustrated reveals good coaxial alignment between the resonant portion of the transducer and the supporting structure. One of the significant shortcomings of the prior arrangements has been the lack of concentricity, causing tool runout and preventing the machining of parts to close tolerances.

Other features of the transducer design disclosed hereafter comprise a high degree of rigidity and resistance to sideways thrust applied to the end of the transducer assembly, and improved ability to transmit torque and axial thrust as is necessary during a drilling or milling operation. Furthermore, the performance of the transducer disclosed is substantially unaffected by minor changes in the operating frequency. Finally, the transducer assembly is adapted to operate as a one-half wavelength resonator, thus maintaining an overall length of approximately 5 inches, using the typical metals most commonly used for the construction of ultrasonic transducer assemblies. This short length makes the device eminently suited as an adapter for standard portable aircraft drills.

One of the principal objects of this invention, therefore, is the provision of a new and improved electromechanical transducer assembly for an ultrasonic machine tool.

Another important object of this invention is the provision of an electromechanical transducer adapted to be used as a coupler for a standard machine tool and imparting to such tool ultrasonic vibration.

Another important object of this invention is the provision of an electromechanical transducer for a machine tool, the transducer being characterized by small dimensions and ability to maintain a high degree of accuracy, specifically small runout of the tool which undergoes rotation and axial vibration.

A further important object of this invention is the provision of a coaxial electromechanical transducer assembly with diaphragm means coupling the active resonating portion of the assembly to the supporting structure, and the diaphragm means being so located as to cause the forces transmitted therethrough to be in opposition.

A still further object of this invention is the provision of an electromechanical transducer assembly comprising a shaft, a sleeve in coaxial relationship with the shaft, electroacoustic excitation means coupled for setting said sleeve into resonance along its longitudinal direction, means for imparting rotation to said assembly and means for coupling a tool to said assembly, said tool being responsive to the rotation and longitudinal vibration.

Further and still other objects of this invention will be more clearly apparent by reference to the following description when taken in conjunction with the accompanying drawings, in which.

Figure 1:
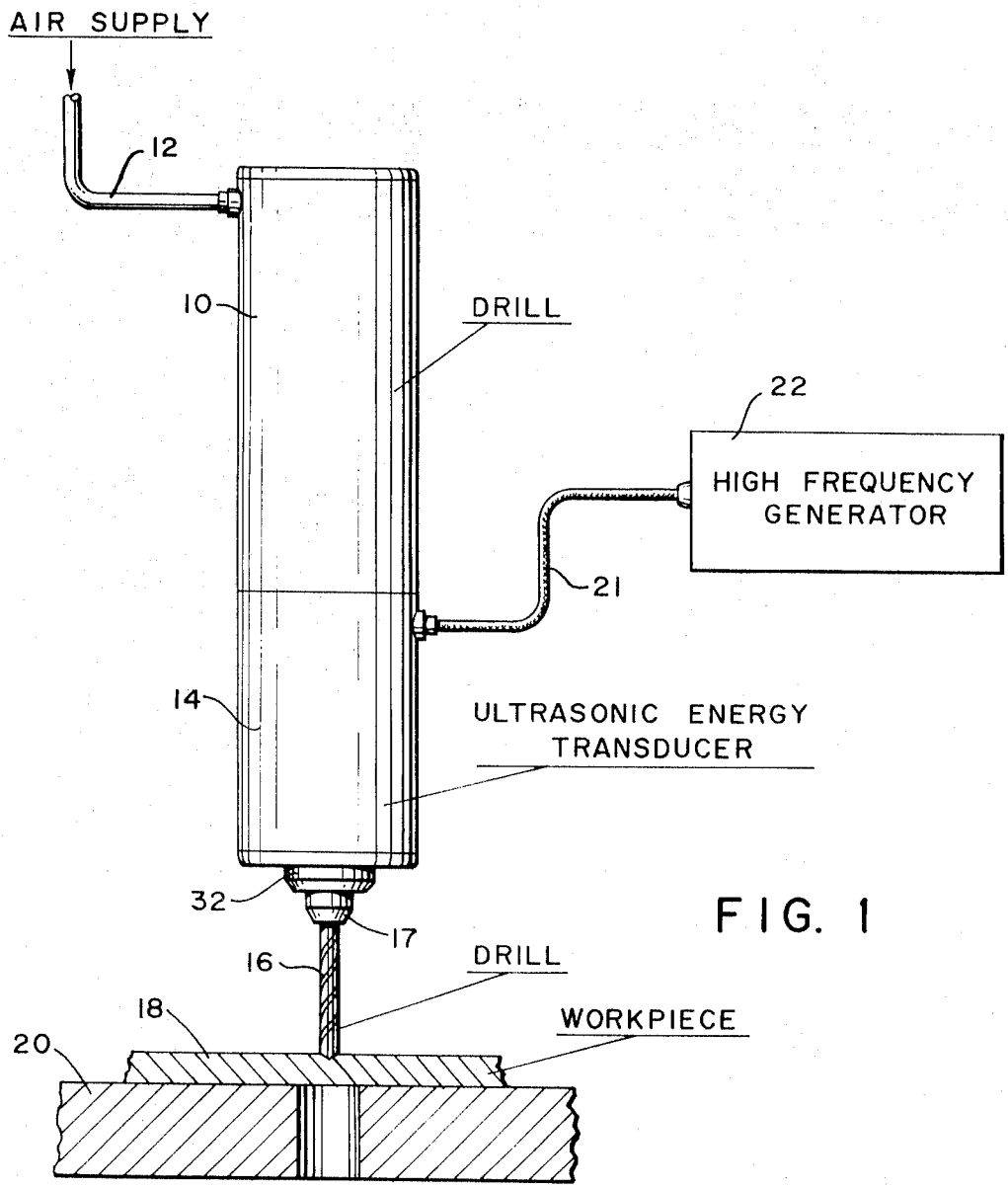
FIG. 1 is a schematic illustration of a typical ultrasonic machine tool.

Referring now to the figures and FIG. 1 in particular, numeral 10 identifies a machine tool, such as a pneumatic "Quackenbush" drill model 15 QDA–S150 made by the Cleco Pneumatic Division of G. W. Murphy Industries, Houston, Texas. The drill is driven by compressed air supplied by conduit 12. An electromechanical transducer 14 adapted to provide vibration in the longitudinal direction at an ultrasonic frequency is coupled to the drill 10, causing the twist drill 16 or a diamond impregnated tool bit to be subjected to rotation while undergoing ultrasonic vibration in the axial direction. As shown the drill is in contact with a workpiece 18 resting on a base 20. Lubrication means, not shown, may be used for aiding the machining process. A high-frequency generator 22 supplies via a conductor 21 electrical high frequency power to the electromechanical transducer for exciting magnetostrictive or piezoelectric means, called generally electroacoustic means, disposed inside the transducer. These latter means convert the applied electrical excitation to mechanical vibration. Typically, the generator 22 provides an electrical signal at 20 kHz. and an output power from 5 watts to several hundred watts, depending on the particular requirements.

Figure 2:
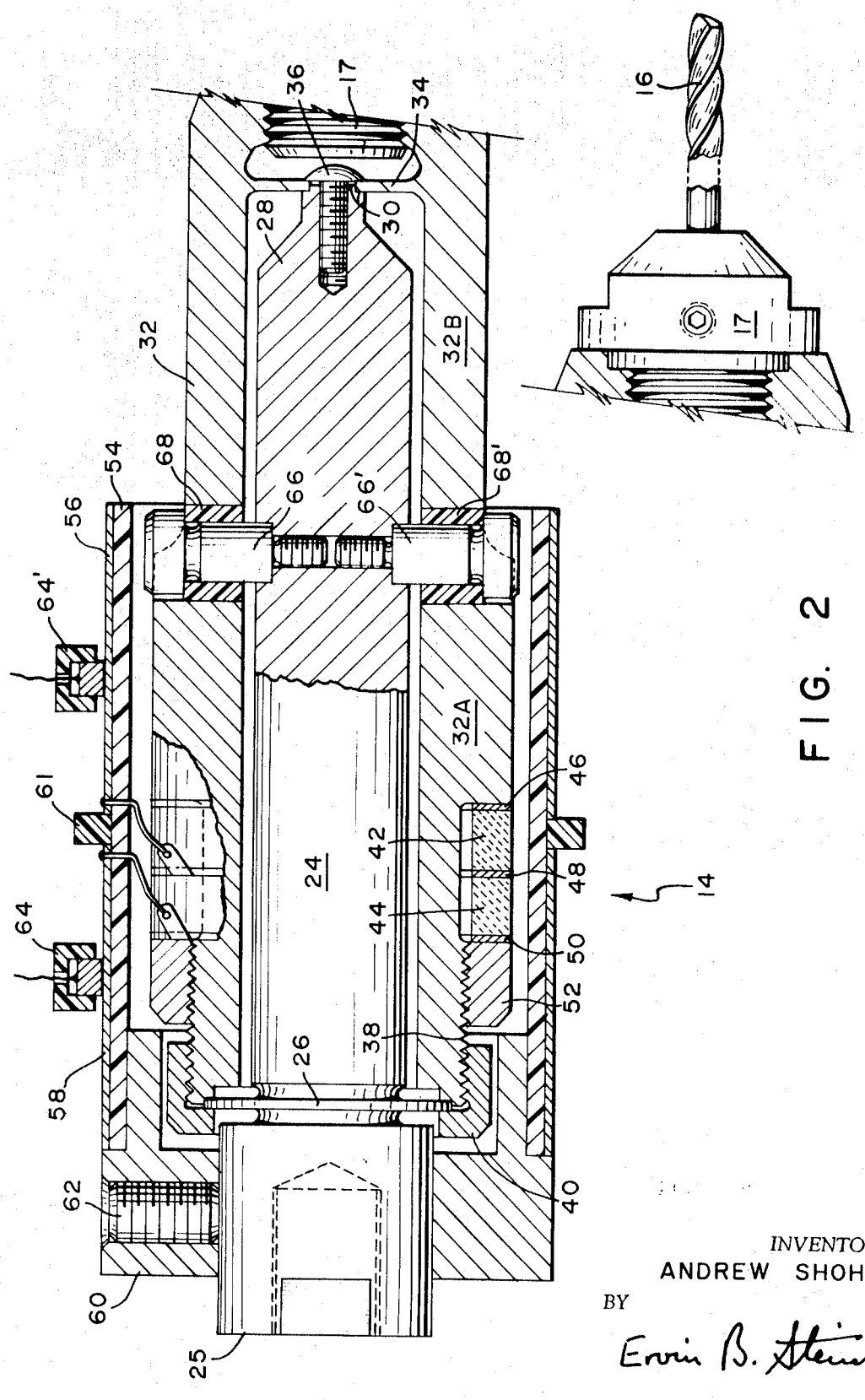
FIG. 2 is a sectional view of the electromechanical transducer forming the present invention.

The construction of the electromechanical transducer 14 adapted to be coupled to the rotary drill device is shown in detail in FIG. 2, the cover having been removed. With reference to this figure, numeral 24 identifies a metal shaft of elongate shape which by means of an upper coupling portion 25 is adapted to be coupled to the drill 10 (FIG. 1) to receive rotation therefrom. The shaft is provided with a relatively thin diaphragm 26 in the form of a radially extending flange. At the lower end, the shaft 24 is beveled, as shown by numeral 28, and terminates in a stepped radial surface 30.

Concentric with the shaft 24 there is disposed a cylindrical metal sleeve 32 having an input upper section 32A and a lower output section 32B of reduced diameter. The sleeve 32 is adapted to resonate as half-wavelength resonator at the frequency of sound travelling therethrough in the axial direction and the sleeve thereby is known also to form a solid horn, velocity transformer, mechanical impedance transformer or similar term, see for instance "Ultrasonic Engineering" (book) by Julian R. Frederick, John Wiley and Sons, Inc., New York, N. Y. (1965) pp. 87–103.

The sleeve is provided with an internally extending diaphragm 34 in the form of a radial flange. A screw 36 clamps the diaphragm 34 against the surface 30 of the shaft 24, thereby coupling the sleeve to the shaft. At the opposite sleeve end, the sleeve 32 is provided with an external thread 38, and an internally threaded bushing 40 is threaded upon the thread 38 to couple and clamp the diaphragm 26 of the shaft 24 to the sleeve.

In order to set the sleeve into vibration there are provided two piezoelectric disk transducers 42 and 44, made typically of lead zirconate titanate material, which are in contact with a set of thin electrode disks 46, 48 and 50. An internally threaded bushing 52 is threaded upon the lower portion of thread 38 and is tightened to put the piezoelectric disks 42 and 44 under compression. The electrodes are connected via respective tabs and electrical conductors to an electrical slip ring assembly comprising a sleeve 54 of insulating material, a pair of electrically conductive slip rings 56 and 58 separated by a ring 61 of insulating material. The sleeve 54 is press fitted upon a bushing 60 which slides upon the outer surface of the coupling portion 25 of the shaft 24. A setscrew 62 secures the slip ring assembly upon the shaft for rotation therewith. The electrical brushes and brushholders 64 and 64', mounting means thereof being not shown, establish contact with the respective slip rings and the electrical brushes, in turn, are connected to the generator 22 (FIG. 1). The lower portion of the output end 32B of the sleeve 32 is provided also with an internal thread to receive a chuck 17 which retains the tool 16. While the sleeve and the shaft are coupled to each other at the diaphragms 26 and 34 by means of the screw 36 and the bushing 40, additional means may be provided to ensure the positive transfer of rotational force or torque between both coaxial members 24 and 32. To this end, a set of radially disposed shoulder screws 66 and 66' are arranged in the nodal region of the sleeve for locking the sleeve 32 to the shaft 24. The shoulder portions of the screws within the sleeve are covered by respective nylon bushings 68 and 68'. The screws, moreover, improve the transmission of axial thrust from said shaft to said sleeve.

Operation of the transducer 14 may be visualized as follows: The sleeve 32 and shaft 24 comprising the main elements of the transducer are set into rotation in unison by rotation applied at the shaft portion 25. Upon energization of the generator 22 the piezoelectric disks 42 and 44 convert the applied electrical energy to mechanical vibration. The transducer is so dimensioned that at the exciting frequency, typically 20 kHz., the sleeve 32 is resonant as a half-wavelength longitudinal resonator whereby the diaphragms 26 and 34 are disposed substantially in the respective two antinodal regions of the resonator. The antinodal regions are those regions exhibiting maximum longitudinal motion and substantially no motion in the radial direction. The thickness of the diaphragms is selected to permit a flexing or dishing of the diaphragms, for enabling the resonant sleeve to expand and contract in accordance with the applied frequency but prevent flexing in the radial direction. In view of the constructional features of the diaphragms and the fact that the diaphragms are disposed in the antinodal regions of the resonator and the absence thereat of radial motion as would exist if the support means were disposed in the nodal regions, accurate coaxial alignment between both elongate members is maintained during operation. Moreover, motion between both members is confined and restricted to that occurring along the longitudinal axis. This constitutes a significant feature and major difference over many prior art devices which largely employ coupling between the resonating portion and the nonresonating support portion of the transducer in the nodal region or nodal plane.

Another important feature of the present design resides in the feature that the respective arial forces transmitted by the diaphragms which couple the shaft and the sleeve to each other are equal and opposite, hence cancelling each other. This is achieved on account of the diaphragms 26 and 34 being spaced-apart one-half wavelength of the vibration within the sleeve. Therefore, the diaphragms are urged to flex outward or inward in a like manner, but opposite direction.

Since the chuck 17 is coupled to the resonating sleeve 32, the drill 16 undergoes axial vibration while simultaneously being rotated responsive to rotation transmitted to the shaft 24 at the portion 25 by the pneumatic drill 10.

The absence of compliant decoupling means imparts to the above-described transducer construction an exceptionally high degree of rigidity, resistance to sideways thrust and ability to transmit axial thrust for drilling operations. Moreover, the diaphragms 26 and 34 are frequency insensitive, that is, not tuned to or responsive to a specific frequency within the transducer operating range and, therefore, capable of accommodating changes in the operating frequency. It should be noted, furthermore, that the concentric mounting is provided at a location close to the drill 16, which feature substantially alleviates the heretofore existing problem of tool runout.

The shaft and sleeve preferably are made of such metals as aluminum or titanium commonly employed for transducer construction. The radially disposed screws 66 and 66' are disposed most suitably in the nodal region of the resonating sleeve with the reduction in diameter of the sleeve 32 occurring in the same region. The dimensioning of vibrators for resonant frequency operation is described in detail in Julian R. Frederick supra.

It will be apparent to those skilled in the art that the construction revealed heretofore may, to some extent, be reversed. Specifically, the shaft can be provided with piezoelectric means and dimensioned to be resonant and mechanically coupled to the sleeve. In this case, the sleeve would be coupled to receive rotation from the drill 10 and the drill bit 16 and chuck would be coupled to the shaft. The electrical connections from the slip ring assembly would extend through the sleeve to the piezoelectric disks. This reversal or interchange of parts constitutes no departure from the principal features disclosed heretofore.

Moreover, instead of the piezoelectric means shown for converting electrical input to mechanical vibration, magnetostrictive means may be used without departing from the scope of the invention.

What is claimed is:

1. A coaxial electromechanical transducer assembly comprising:
    a first elongate member;
    a second elongate member surrounding, at least partially, said first member and being radially spaced from said first member;
    electroacoustic means coupled to one of said members for causing, responsive to the energization of said electroacoustic means with an electrical signal of predetermined frequency, said one member to undergo axial vibrations and be resonant, whereby said one member exhibits antinodal regions of axial vibration spaced apart by one-half wavelength of the vibrations, and
    diaphragm support means adapted to flex disposed at least at two of said antinodal regions for coupling said members to each other in spatial relationship and for restricting relative movement between said members to motion along the axial direction, and said respective diaphragm support means causing the axial forces transmitted therethrough to be in opposition.

2. A coaxial electromechanical transducer assembly as set forth in claim 1, said diaphragm support means being spaced-apart substantially one-half wavelength of the vibration of said one member.

3. A coaxial electromechanical transducer assembly as set forth in claim 1, said diaphragm support means having the shape of radial flanges, each flange extending from one of the members to the other member, and means for fastening said members to one another at said flanges.

4. A coaxial electromechanical transducer assembly as set forth in claim 3, and means disposed at one end of said one member for receiving tool adapted to operate on a workpiece.

5. A coaxial electromechanical assembly as set forth in claim 4, and said one member being dimensioned to be resonant at an ultrasonic frequency.

6. An electromechanical transducer assembly as set forth in claim 5, and means coupled for imparting rotation to one of said members for rotating said assembly about its axis.

7. An electromechanical transducer assembly comprising:
    a shaft;
    a sleeve concentric with said shaft and radially spaced therefrom;

said sleeve being dimensioned to undergo axial vibrations and be resonant as a half-wavelength resonator at the frequency of sound traveling longitudinally through said sleeve, said sleeve when resonant exhibiting a pair of antinodal regions of longitudinal motion;

electroacoustic means adapted to be excited with electrical energy of predetermined frequency coupled to said sleeve for causing said sleeve to be resonant;

a radial flange adapted to undergo flexural motion disposed at each of said antinodal regions and coupling said shaft to said sleeve whereby to support said sleeve about said shaft and said flanges restricting movement of said sleeve when resonant to motion principally along the longitudinal axis;

means coupled for imparting rotating motion to said shaft;

tool-receiving means disposed on said sleeve for causing a tool coupled to said receiving means to be responsive to the rotating motion imparted to said shaft and to the vibratory motion of said sleeve, and an electrical slip ring assembly coupled mechanically to said shaft and electrically coupled to said electroacoustic means for providing electrical excitation to said electroacoustic means when said transducer is rotating.

8. An electromechanical transducer assembly as set forth in claim 7, said electroacoustic means comprising a set of piezoelectric disks, and including clamping means for holding said disks under compression and coupling said disks to said sleeve.

9. An electromechanical transducer as set forth in claim 8 and means for securing said shaft and sleeve in fixed angular relationship for causing positive transfer of rotational torque and axial thrust from said shaft to said sleeve.

10. An electromechanical transducer as set forth in claim 9, said means securing said shaft and sleeve in fixed angular relationship comprising radially placed means disposed substantially in a nodal region of said sleeve and extending from said sleeve into said shaft.

11. An electromechanical transducer assembly as set forth in claim 7, one of said radial flanges being integral with said sleeve and the other radial flange being integral with said shaft.

12. A coaxial electromechanical transducer assembly comprising:

a first elongate member;

a second elongate member surrounding, at least partially, said first member and being radially spaced from said first member;

electroacoustic means coupled to one of said members for causing, responsive to the energization of said electroacoustic means with an electrical signal of predetermined frequency, said one member to undergo axial vibrations and be resonant, whereby said one member exhibits antinodal regions of axial vibration spaced apart by one-half wavelength of the vibrations;

metallic support means adapted to flex disposed at two of said antinodal regions for locating and coupling said members in spatial relationship to each other, and said support means being of a configuration to restrict relative movement between said members to motion principally to that along the axis of said assembly, and means coupled to one of said members for imparting rotation thereto whereby to rotate said assembly.

13. A coaxial electromechanical transducer assembly as set forth in claim 12, said support means comprising flange shaped means.

14. A coaxial electromechanical transducer assembly as set forth in claim 12, said support means comprising diaphragm means.

15. A coaxial electromechanical transducer assembly as set forth in claim 14, said diaphragm means being disposed at two proximate antinodal regions.

16. A coaxial electromechanical transducer assembly comprising:

a first elongate member;

a second elongate member surrounding, at least partially, said first member and being radially spaced from said first member;

piezoelectric transducer means coupled to one of said members for causing, responsive to the energization of said piezoelectric transducer means with an electrical signal of predetermined frequency, said one member to undergo axial vibrations and be resonant, whereby said one member exhibits antinodal regions of axial vibration spaced apart by one-half wavelength of the vibrations;

diaphragm support means adapted to flex disposed at least at two of said antinodal regions for coupling said members to each other in spatial relationship and for restricting relative movement between said members to motion along the axial direction, and said respective diaphragm support means causing the axial forces transmitted therethrough to be in opposition, a pair of electrically conductive slip rings mounted to said assembly and electrically connected to said piezoelectric means, and means locking said elongate members to each other in angular relation to ensure positive transmission of rotational force between said members.

* * * * *